Figure 1:
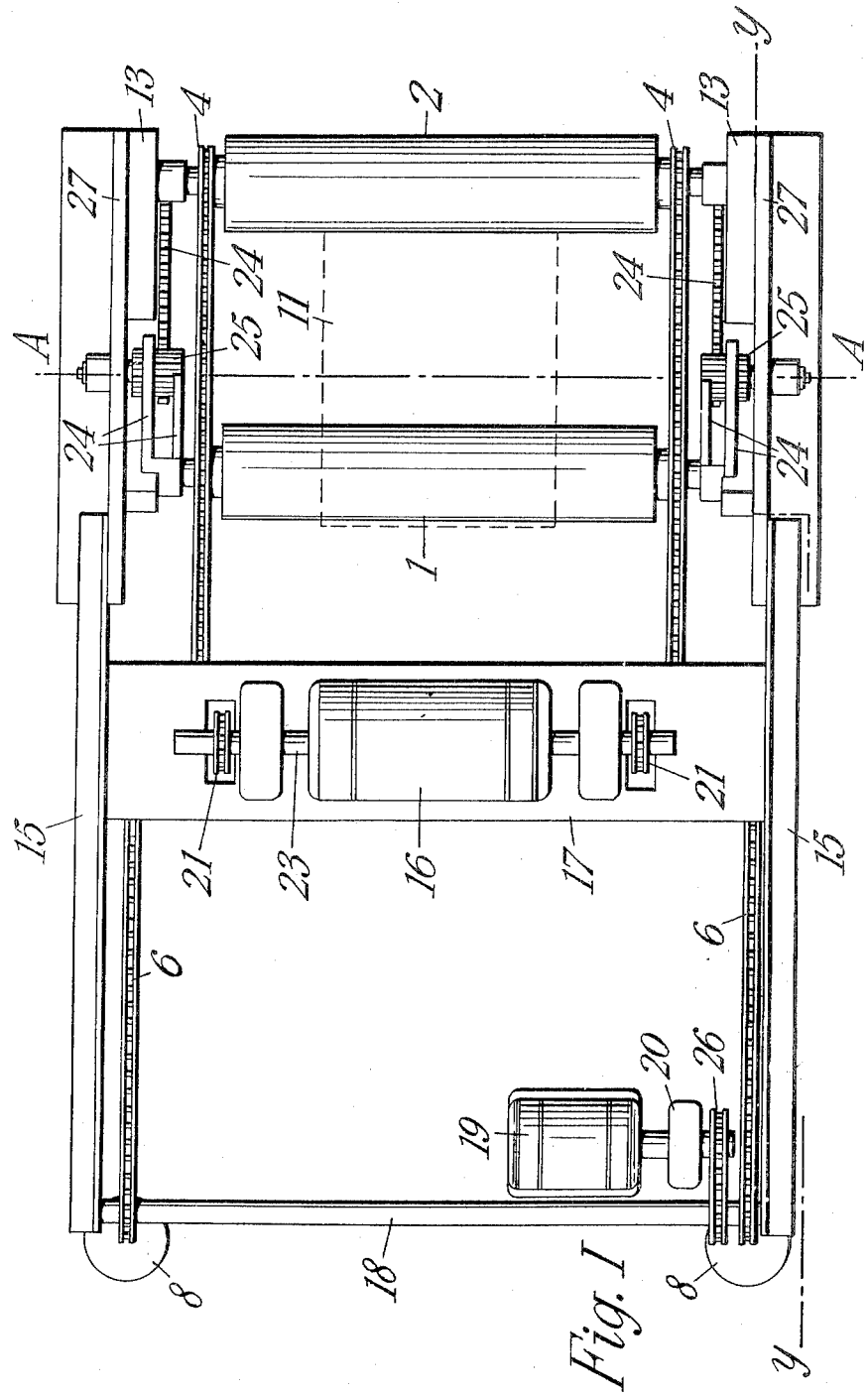

Thomas Edward Horace Gray
James Jones-Hinton
Inventors
by Benj. T. Rauber
their attorney Oct. 4, 1955
T. E. H. GRAY ET AL
2,719,324
APPARATUS FOR REDUCING THE DIAMETER
OF PLASTIC CYLINDRICAL BODIES
Filed Jan. 22, 1952
6 Sheets-Sheet 2
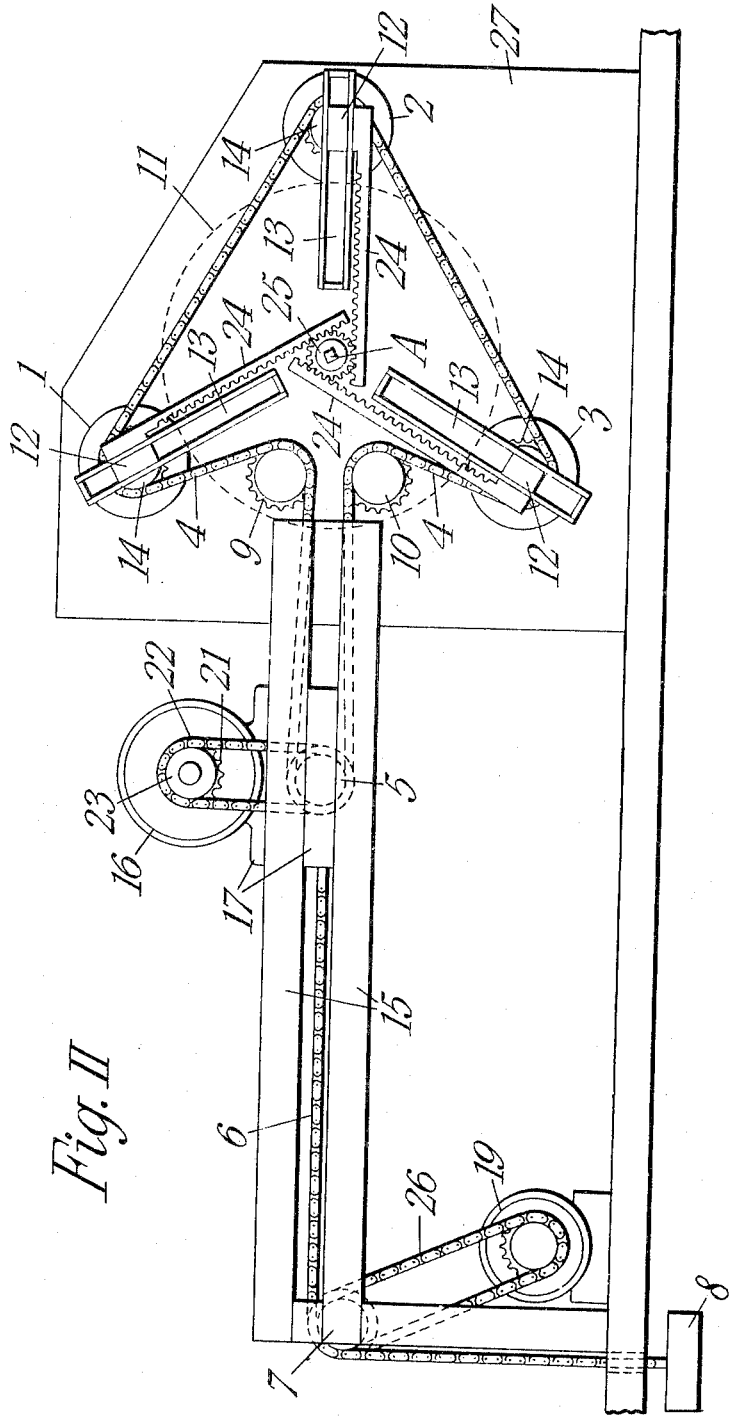
Fig. II

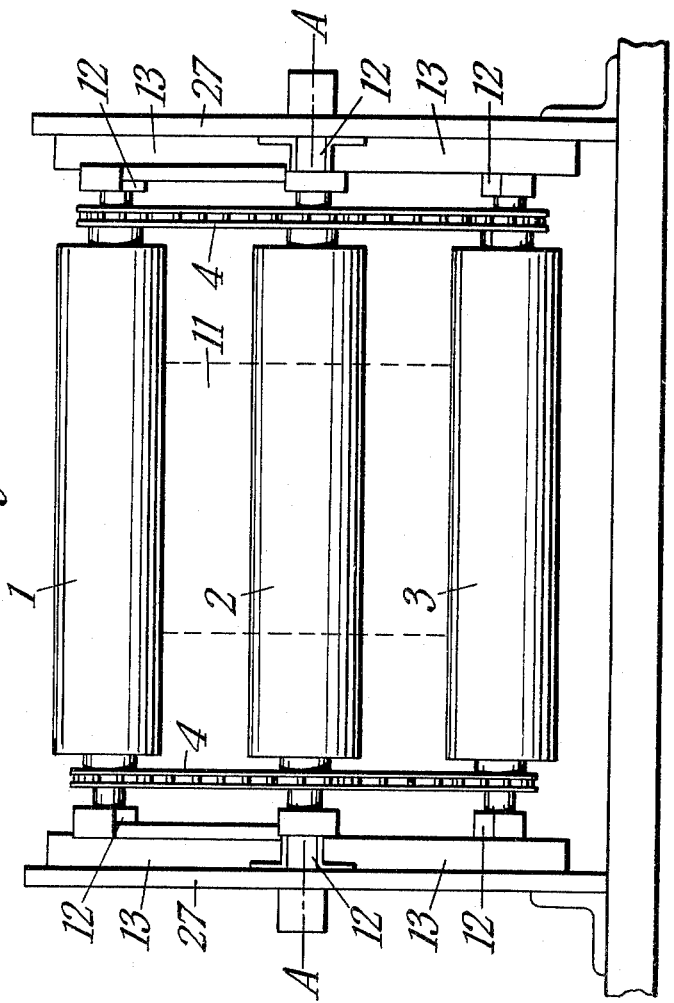

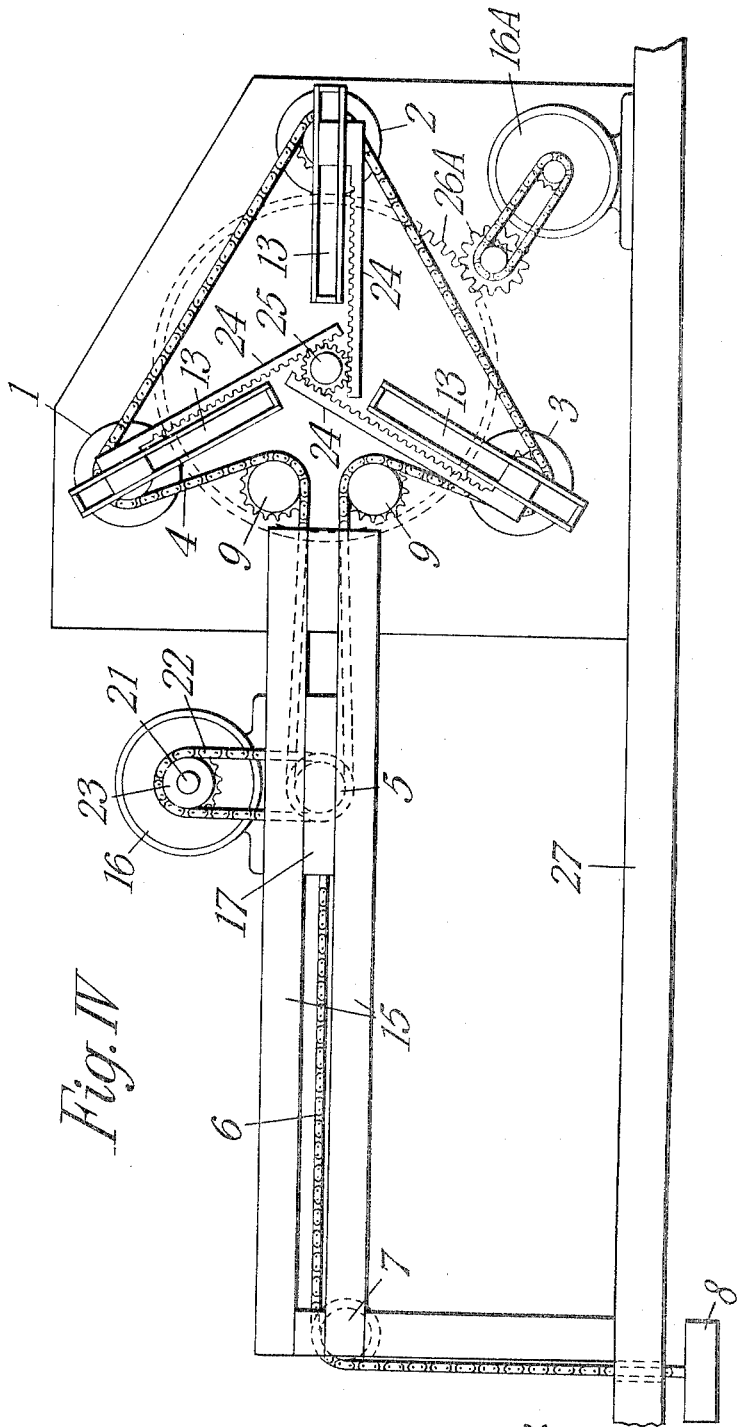

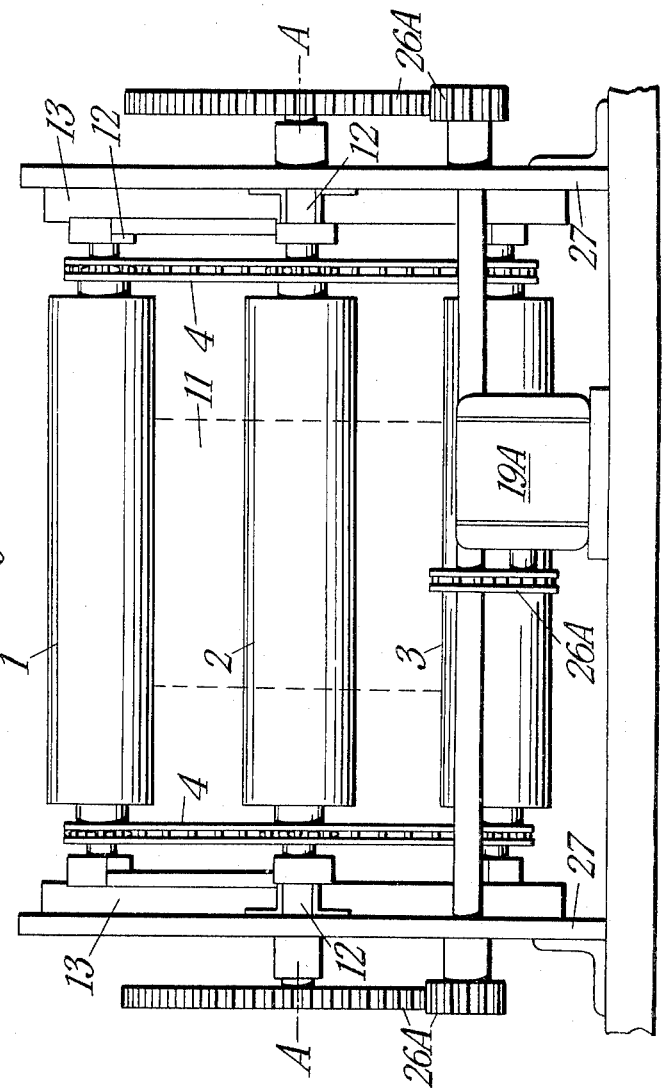

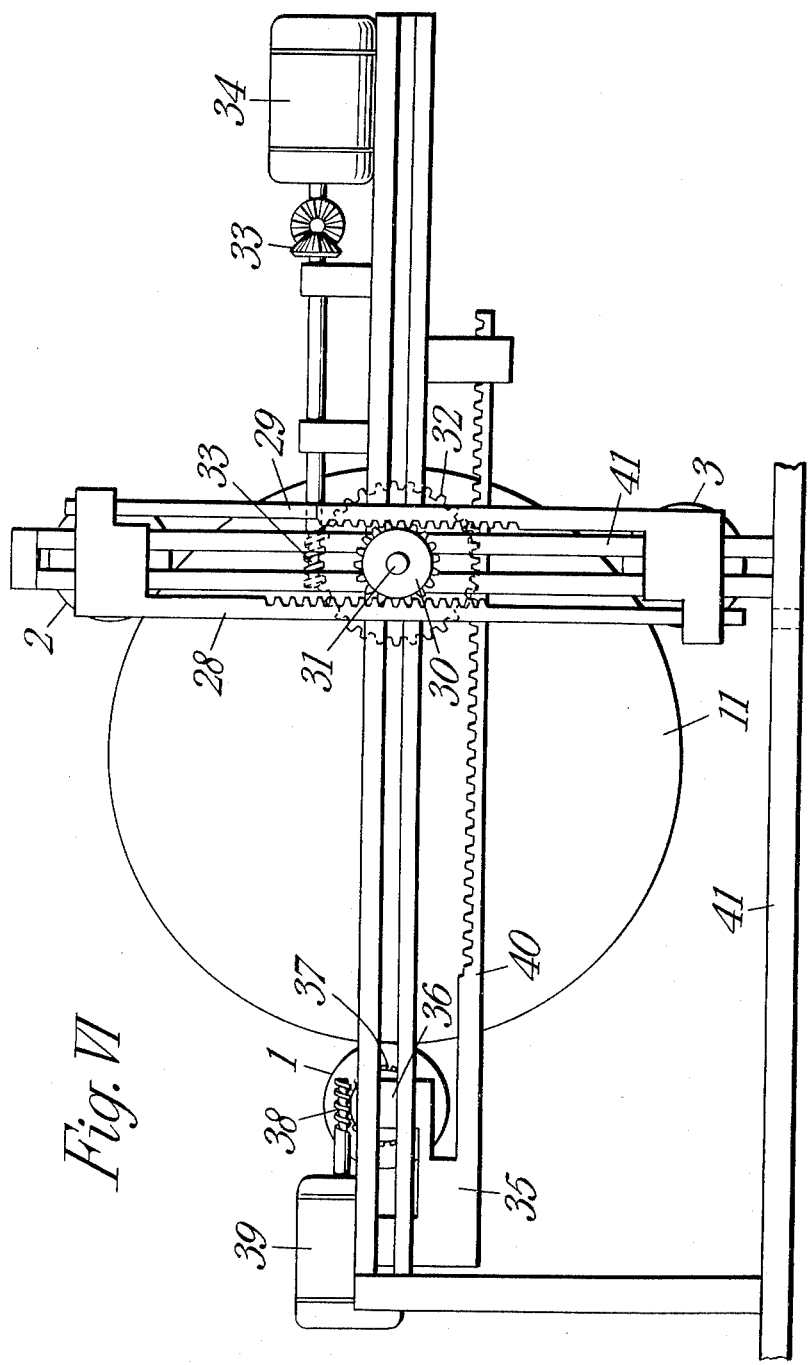

United States Patent Office 2,719,324
Patented Oct. 4, 1955

2,719,324

APPARATUS FOR REDUCING THE DIAMETER OF PLASTIC CYLINDRICAL BODIES

Thomas Edward Horace Gray, Sutton Coldfield, and James Jones-Hinton, Henley-in-Arden, England, assignors to Dunlop Rubber Company, Limited, London, England, a British company Application January 22, 1952, Serial No. 267,582

Claims priority, application Great Britain February 6, 1951

13 Claims. (Cl. 18—9)

This invention relates to apparatus for reducing the diameter of plastic cylindrical bodies, in particular plastic cylindrical bodies having a uniform coloured pattern extending throughout their length and visible on cross-sectional faces of the bodies.

To produce a multiplicity of small medallions bearing a complicated design from rubber or plastic material it is convenient to build up the pattern from strips of plastic material, e. g. vulcanizable rubber compositions, of different colours, in the form of a cylindrical body of considerably greater diameter than the medallions, the cross-section of the cylindrical body showing the desired pattern on a correspondingly enlarged scale. The cylindrical body can then be rolled under pressure to reduce the diameter of the cylinder and the scale of the pattern is thus also correspondingly reduced; pieces of appropriate length can then be cut from this body of reduced diameter and if of vulcanizable rubber composition the pieces are then vulcanized. It is desirable that the reduction should proceed uniformly along the whole length of the cylindrical body and that the reduction should be effected in a continuous manner in order that any desired reduction in scale shall be possible. It is also desirable that cylindrical bodies of different diameter should be capable of reduction in diameter by the same apparatus.

It is an object of the present invention to provide apparatus whereby reduction in diameter of a plastic cylindrical body can be effected uniformly and in a continuously varying manner, and in which cylindrical bodies of different initial diameters can be treated.

According to the present invention apparatus for reducing the diameter of a plastic cylindrical body comprises at least three parallel rollers mounted in slidable bearings and disposed to grip the plastic cylindrical body therebetween, means for positively rotating at least one of the rollers, and means for continuously urging each of the rollers against the surface of the plastic cylindrical body.

Preferably the apparatus comprises at least three parallel rollers spaced equiangularly around a common axis and mounted in bearings slidable radially from and towards the axis, driving means for rotating each roller in the same sense and at the same speed, and means for urging each roller towards the common axis.

In using the apparatus the plastic cylindrical body is placed between the rollers so that it is gripped and thus located by them, and the rollers are then rotated and at the same time urged towards the common axis. Pressure is thus exerted uniformly on the cylindrical body by each roller and in addition friction between the rollers and the cylindrical body causes the latter to rotate. Rotation may be continuously in one sense, or rotation may be first in one direction and then in the opposite direction. The diameter of the cylindrical body is thus gradually reduced with corresponding increase in its length. As the reduction in diameter takes place gradually it can be interrupted at any stage where the desired reduction in diameter has taken place. The reduction in scale of the cross-section of the cylindrical body is also uniform throughout the length thereof since pressure is applied to it uniformly. Cylindrical bodies of different initial diameter can be accommodate in the same apparatus by adjusting the initial position of the rollers.

Each roller of the apparatus may be independently driven at the same speed, or one or some of the rollers only may be positively driven, the other rollers being freely rotatable. The means for urging the rollers inwards may be springs mounted on slides for the bearings for the rollers and urging the bearings in the appropriate direction, the springs being under compression when the rollers are spaced apart to accommodate an untreated plastic cylindrical body, and the tension in the spring being relieved as the diameter of the plastic cylindrical body decreases. The rollers may also be urged inwardly by racks, one associated with the bearing of each roller, the racks engaging a positively driven pinion whereby the roller mountings are movable along the slides in which the bearings are located.

It is preferred however, to rotate the rollers by providing each with a driving sprocket over which an endless chain passes, the chain being driven by a prime mover through a further sprocket. Each roller is thus driven at a common speed and in the same sense from a common source of power. The endless chain may also be employed as the means for urging the rollers against the plastic cylindrical body by maintaining it under tension throughout the operation of the apparatus. In cases where the plastic cylindrical body exerts a substantial resistance to deformation only a slow reduction in diameter is possible and the number of rotations of the cylindrical body relative to the decrease in diameter will be high. Maintaining tension in the chain provides a convenient means of positively moving the rollers inwards very slowly relative to the rate of rotation of the rollers, and this form of the invention is thus particularly useful for treating bodies which offer substantial resistance to deformation.

The tension in the chain may be maintained by mounting the sprocket driven by the prime mover, or an idler sprocket, on a moveable support and gradually moving the support so that the tension is maintained as the diameter of the cylindrical body decreases. For example the driving sprocket and the prime mover may be mounted on a slidable carriage and a chain attached to the carriage may be provided which passes over a sprocket driven by a second prime mover. Positive provision may be made for ensuring that the rollers move in at equal rates comprising a rack and pinion device comprising a rack associated with each roller bearing extending inwards parallel to the bearing slides, each such rack engaging a common pinion freely rotatable about the common axis. By mounting the pinion on an axle provided with a crank handle the same rack and pinion device may also be used for quickly moving the rollers apart or towards one another to remove a treated plastic cylindrical body and to insert another.

One form of the invention will be more particularly described with reference to the accompanying drawings.

Figure I is a plan view of the apparatus.
Figure II is a side elevation taken along y—y of Figure I.
Figure III is an end view of the roller system.
Figure IV is a side view of an alternative apparatus.
Figure V is an end view of the apparatus of Figure IV.
Figure VI illustrates a further form of the invention.

In the apparatus illustrated in Figures I, II and III, three rubber-covered mild steel rollers 1, 2, 3, are provided of equal length greater than the final length of the cylindrical body 11 to be treated, and are located parallel to each other and to a common axis AA. Each roller is mounted in framework 27 by means of a bearing 12 at each end which is slidable in a slotted member 13 in radial alignment with the common axis AA so that the three rollers can slide radially away from and towards the said common axis AA. At each end each of the three rollers carries a sprocket wheel 14, the three wheels at the same end of the set of rollers being coplanar. A movable carriage 17 is slidable along bearing members 15 away from and towards the common axis AA, and carries a driving axle (not shown) parallel to the rollers and carrying four sprocket wheels 5, one at each end thereof and each located in a plane passing through the respective sprocket wheels 14 of rollers 1, 2 and 3, the other two sprocket wheels being situated intermediately of the first pair and each located in a plane passing through the respective sprocket wheels 21. Sprocket wheels 21 are attached to a second axle 23 driven by an electric motor 16 on the movable carriage 17. An endless driving chain 4 passes over each set of coplanar roller sprocket wheels 14 and the corresponding sprocket wheel 5 on the driving axle, and an endless chain 22 also passes over each pair of coplanar sprocket wheels 5 and 21. Idler sprockets 9 and 10 insure that each sprocket chain 4 engages an adequate number of teeth of the sprocket wheels on the rollers nearest to the driving axle, and that the sprocket chains assume a substantially symmetrical configuration in relation to each of the slides 13 so that the rollers are urged uniformly towards the common axis. The sprocket chains 4 are thus caused to drive the rollers in the same sense on operation of the electric motor 16.

A further sprocket chain 6 is attached to each end of the movable carriage 17, and each such chain passes over a corresponding sprocket wheel 7 mounted on axle 18 which can be driven by a second electric motor 19 through a reduction gearing 20 and sprocket chain 26. The second end of each sprocket chain 6 carries a counterpoise 8. To insure that the rollers 1, 2 and 3 progress towards the common axis AA at the same linear speed, racks 24 rigidly attached to the bearings are provided, which racks are aligned parallel to the slide members 13 and in different vertical planes, and tangentially engage a freely rotatable pinion 25.

In using this apparatus for reducing the diameter of a plastic cylindrical body having a patterned cross-section, the mild steel rollers 1, 2 and 3 are moved apart to permit insertion of a plastic cylindrical body and the rollers are brought together by means of the racks so that they grip the body, which is thus located between them with its axis coincident with the common axis AA. The axle 23 is rotated by means of the electric motor 16 and the motion is transmitted to sprocket chain 4 whereby the rollers are caused to rotate. The rubber covering on the rollers ensures sufficient friction between the rollers and the plastic body to cause it to rotate with them continuously. The axle 18 carrying the sprocket wheels 7, over which the sprocket chains attached to the counterpoises 8 pass, is also caused to rotate through the reduction gearing of the second motor 19 at a predetermined rate selected to be appropriate to the flow characteristics of the plastic cylindrical body so that the carriage 17 and the driving axle 23 for rotating the rollers 1, 2 and 3 are slowly moved away from the rollers. The sprocket chains 4 which pass round the sprockets 14 of the driving rollers are thus under tension and urge each roller towards the axis and thus press against the plastic cylindrical body and gradually reduce its diameter. With this arrangement the reduction in diameter of the plastic cylindrical body may be so slow that the outward movement of the carriage 17 is hardly perceptible on casual observation. The racks 24 co-operating with the pinion 25 ensure that each roller moves inwards to the same extent, and the plastic cylindrical body rotates about the common axis AA. As the cylindrical body continues to rotate and is continually pressed by the three rollers, its diameter is progressively reduced and its length consequently increases; thus it is converted to a longer plastic cylindrical body of smaller diameter having in cross-section a pattern corresponding to that of the original plastic cylindrical body but on a reduced scale corresponding to the reduction in diameter.

It is preferred that a reversing switch, automatically operated, is incorporated into the electrical circuit of motor 16 causing the cylindrical plastic mass to rotate first in one direction so that a small reduction in diameter results and then in the opposite direction for the same period of time, and so on until the necessary degree of reduction has been attained.

The form of the invention illustrated in Figures IV and V is a modification of the apparatus shown in Figures I, II and III, most of the parts being the same as in Figures I to III and being similarly numbered. However, the electric motor 19 and the chain drive 26 are omitted and the rollers 1, 2 and 3 are urged uniformly towards the common axis AA by means of a drive from an electric motor 19A on to the pinion 25 through gearing 26A. The counterweights 18 are then the only means of urging the carriage 17 away from the common axis AA, and suffice to maintain the chain 4 under a tension sufficient only to drive rollers 1, 2, and 3. This form of the invention has the advantage that the tension in the sprocket chain is very much reduced, thus lessening its tendency to stretch.

The drive from the electric motor to the pinion wheel 25 may be of any suitable form, e. g. through gear wheels and chain and sprocket as shown in Fig. 5, and should the electric motor be provided with means for reversing, the rollers may be conveniently and rapidly returned to a predetermined spacing to accommodate a further cylindrical body by reversing the direction of movement of the racks 24 and hence of the rollers 1, 2 and 3.

This form of the invention is more particularly suited to the treatment of relatively soft plastic cylindrical bodies where a fairly rapid reduction in diameter is possible.

In the form of the invention illustrated with reference to Fig. VI, three rollers 1, 2 and 3 are provided between which the cylindrical body 11 is located; the rollers 2 and 3 are mounted to be movable in a vertical plane towards and away from one another, the motion being brought about by means at each end of the rollers each comprising racks 28 and 29 which engage a pinion 30 fixed on an axle 31, which also carries a second pinion wheel 32 of greater diameter. One pinion wheel 32 can be rotated through gearing 33 driven by the prime mover 34. The roller 1 is mounted on a slidable carriage 35 and is rotatable in the bearings 36 about an axle also carrying a fixed pinion 37 which can be rotated by worm wheel 38 driven by prime mover 39 also mounted on carriage 35. Projecting horizontally from each side of the carriage 35 is a horizontal rack 40 which engages the corresponding pinion 32. Rollers 2 and 3 are freely rotatable in the slidable bearings carrying the racks 28 and 29 respectively, the assembly being mounted in a framework 41. The relative diameter of the pinions 30 and 32 and the rates of rotation of prime movers 34 and 39 are such that when the apparatus is in operation rollers 2 and 3 are moved slowly towards one another and the roller 1 moves towards the plane of the rollers 2 and 3 slowly, but not as slowly as the rollers 2 and 3 approach one another. To treat a cylinder 11 initially as large as shown in Fig. VI, additional rollers mounted on spring supports on the base of frame 41 may be provided to assist in supporting the body 11. Alternatively the apparatus may be arranged so that rollers 2 and 3 are in a horizontal plane and roller 1 is above that plane.

In the operation of this form of the apparatus the rollers 1, 2 and 3 are moved apart to their extreme positions to accommodate a plastic cylindrical body 11 whose diameter is to be reduced, and the apparatus is put into operation whereupon rollers 2 and 3 move together very slowly, roller 1 is positively rotated by the prime mover 39 through worm 37 and pinion 38 and the friction between this roller and the plastic cylindrical body causes the latter to rotate. The operation of prime mover 34 through gearing 33 on the one pinion 32 causes the racks 40 and thus the carriage 35 supporting the roller 1 to move towards the plane of rollers 2 and 3. The necessary pressure is exerted on the plastic cylindrical body by rollers 1, 2 and 3 and the gradual reduction in diameter of the body takes place. As this occurs the axis of the cylindrical body will also move gradually towards the plane containing the rollers 2 and 3 and a stage will come when it is between those rollers, the distance between the opposed surfaces of rollers 2 and 3 being the same as the diameter of the plastic cylindrical body 11. Further actuation of the prime movers 34 and 39 will thus cause the plastic cylindrical body to be pushed through the gap between the rollers 2 and 3 and it will thus automatically be discharged from the apparatus.

Thus by suitably controlling the relative rates of approach of rollers 2 and 3 and the rate of movement of roller 1 towards them, the diameter of the plastic cylindrical body which is produced can be altered and cylinders of different predetermined diameters can be produced and discharged automatically. The movement of the roller 1 towards the pinion 32 may if desired be brought about by means independent of the prime mover 34, rack 40 and pinion 32 being then omitted. With this form of the apparatus, if prime mover 34 is an electric motor a cut-out may be provided in the electrical circuit of the motor whereby when the rollers 2 and 3 are a predetermined distance apart equal to the diameter of the plastic cylindrical body which it is desired to produce, the motor 34 is stopped. If roller 1 has not then moved so far towards the rollers 2 and 3 that the cylinder is ejected, further rotation in diameter of the plastic cylindrical body will occur until this diameter is reached, whereupon the cylinder will be pushed towards the rollers 2 and 3 by the roller 1 and will then be ejected.

The apparatus may be used for producing cylindrical bodies from which patterned elements for the production of single stage multicolour printing rollers may be made, e. g. rollers of the type described in co-pending application of Hogg, Ser. No. 250,020, filed October 5, 1951. It may also be used for bringing plastic bodies of approximately cylindrical form to a true cylinder of predetermined diameter.

The apparatus may also be used in the confectionary trade for producing a cylindrical sweetmeat internally incorporating, uniformly through its length, a pictorial design, pattern or inscription pigmented in contrast with the basic material, e. g. peppermint rock. In this case or in other cases where plastic materials are treated which are too stiff or brittle when cold but which soften on heating, the rollers may be heated, for example by using hollow rollers through which hot water or steam is circulated.

Having described our invention, what we claim is:

1. Apparatus for reducing the diameter of a plastic cylindrical body which comprises at least three parallel rollers mounted in slidable bearings and disposed to grip the plastic cylindrical body therebetween, means for positively rotating at least one of the rollers, and means for continuously urging each roller against the plastic cylindrical body.

2. Apparatus for reducing the diameter of a plastic cylindrical body which comprises at least three parallel rollers spaced equiangularly around a common axis, and mounted in bearings slidable radially from and towards said common axis to grip the plastic cylindrical body therebetween, driving means for positively rotating at least one of the rollers and means for continuously urging each roller towards the common axis.

3. Apparatus according to claim 2 in which the said driving means for rotating the rollers comprises a driving sprocket for each roller, a sprocket rotatable by a prime mover, and an endless chain engaging each of said sprockets.

4. Apparatus according to claim 3 in which the means for urging each roller towards a common axis comprises a moveable support for the sprocket rotatable by the prime mover and mechanism for so moving the support as to maintain the endless chain under tension.

5. Apparatus according to claim 4 in which the sprocket rotatable by a prime mover is mounted with the latter on a carriage slidable away from the common axis and the mechanism for moving the said support comprises a chain attached to the carriage, and a driving sprocket engaging said chain.

6. Apparatus according to claim 1, in which the means for urging each roller towards or away from the said common axis comprises a rack associated with the slidable bearings of each roller and engaging a common driving pinion.

7. The apparatus of claim 1 having a common transmission between the slidable bearings of said rollers to proportion their movement against said plastic cylindrical body.

8. The apparatus of claim 7 in which said common transmission comprises a pinion and racks, one secured to each bearing engaging said pinion.

9. The apparatus of claim 8 in which said pinion is coaxial with said plastic cylindrical body.

10. The apparatus of claim 7 in which said common transmission comprises pinions connected to rotate at fixed relative speeds and racks secured one to each bearing and meshing with one of said pinions.

11. The apparatus of claim 1 in which said means for urging said rollers against the plastic cylindrical body comprises a motor and a transmission from said motor to the slidable bearings of said rollers to drive said rollers positively against the plastic cylindrical body.

12. The apparatus of claim 1 in which said means for positively rotating said rollers comprises an endless chain driven by said motor and sprocket wheels, one for each roller, driven by said chain and in which said means for continuously urging each roller against the plastic cylindrical body comprises a tightening sprocket for said endless chain and a motor for moving said tightening sprocket to tighten said chain.

13. The apparatus of claim 1 in which said means for continuously urging each roller against the plastic cylindrical body comprises a common driving pinion, racks meshing with said common driving pinion and secured one to a slidable bearing and a motor for rotating said driving pinion.

References Cited in the file of this patent

UNITED STATES PATENTS

| 2,101,357 | Assel | Dec. 7, 1937 |
| 2,384,457 | Dewey | Sept. 11, 1945 |